INVENTORS
E. H. Nixon
J. W. Wheeler,
S. Gundersen
ATTORNEY

United States Patent Office 3,515,996
Patented June 2, 1970

3,515,996

CIRCUIT FOR DETERMINING WHEN A SWEEP FREQUENCY IS SUBSTANTIALLY EQUAL TO A STANDARD FREQUENCY

Earl Hollis Nixon and John Watson Wheeler, Greensboro, N.C., assignors to Western Electric Company, Incorporated, New York, N.Y., a corporation of New York Filed Dec. 14, 1966, Ser. No. 601,740
Int. Cl. H03d 13/00
U.S. Cl. 328—133 6 Claims

ABSTRACT OF THE DISCLOSURE

The modulation product of a sweep frequency and a standard frequency is passed through a low bandpass filter circuit to a bistable circuit which produces a control pulse when the sweep freqency is substantially equal to the standard frequency. The bistable circuit is switched from a first state to a second state by a predetermined edge of a first pulse passing through the lower bandpass filter circuit, and from the second state to the first state by a predetermined edge of a second pulse passing through the lower bandpass filter circuit.

This invention relates to a circuit for determining when a sweep frequency is substantially equal to a standard frequency.

In the manufacture of microwave transmission networks, the networks are tested at discrete standard frequencies within the microwave band by applying a sweep frequency to the inputs of the networks and operating a characteristic measuring device connected to the outputs of the networks when the sweep frequency is substantially equal to the discrete standard frequencies. The sweep frequency is modulated by the standard frequencies to produce beat frequencies which are the product of the frequencies. The beat frequency signals are applied to a low pass filter and detector circuit to produce control pulses which operate the characteristic measuring device when the sweep frequency is substantially equal to one of the standard frequencies. Variations in the magnitudes of the different standard frequencies and nonlinearity in the frequency response of the low pass filters produce undesirable variations in the duration of the control pulses and the accuracy of the reading at a particular frequency.

An object of the present invention is a new and improved circuit for producing a control signal when a sweep frequency is substantially equal to a standard frequency.

Another object of the invention is a circuit for producing a constant width control pulse from a beat frequency when the heat frequency is substantially equal to zero frequency.

With these and other objects in view, the present invention contemplates a circuit wherein the product of the sweep frequency and the standard frequency is passed through a low bandpass filter circuit to a bistable circuit which produces a control signal to operate the characteristic measuring device. The low bandpass filter circuit produces a first output pulse before the sweep frequency sweeps through the standard frequency and a second pulse after the sweep frequency sweeps through the standard frequency. The bistable circuit is switched from a first state to a second state by a predetermined edge of the first pulse and from the second state to the first state by a predetermined edge of the second pulse to produce the control signal.

The invention may be better understood by reference to the following detailed description when considered in conjunction with the accompanying drawings, wherein.

Figure 1:
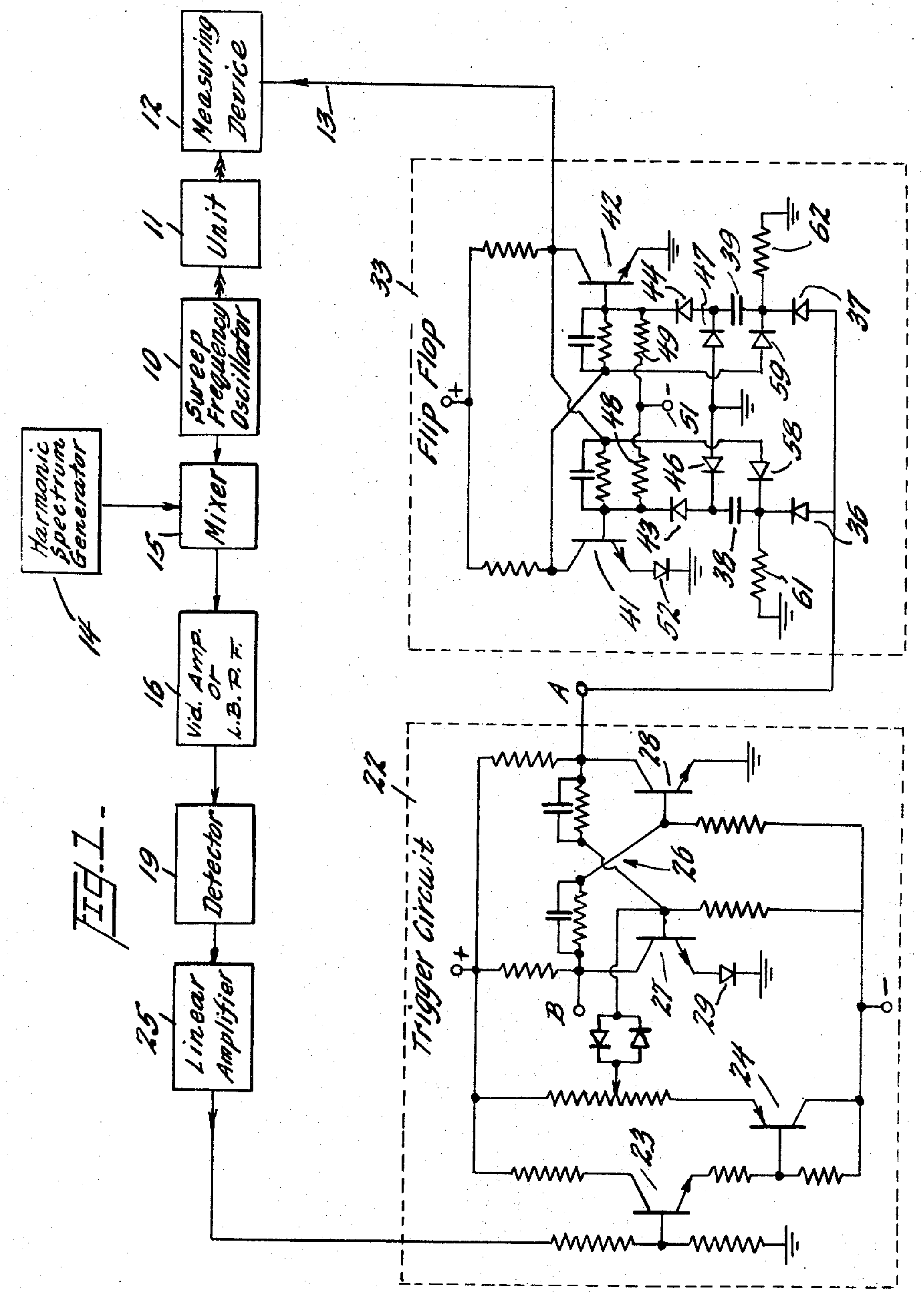
FIG. 1 is a diagram of an embodiment of the invention.

Referring to FIG. 1, a microwave component or unit 11 is tested by applying a signal from a sweep frequency oscillator 10 to the input of the unit 11 and measuring the output signal of the unit 11 when the sweep frequency is substantially equal to discrete standard frequencies. The discrete standard frequencies are determined by a harmonic spectrum generator 14. A mixer 15, a video amplifier or low bandpass filter 16, a detector 19, a linear amplifier 25, a trigger circuit 22, and a flip-flop 33 cooperate to produce control pulses which operate a measuring device 12 when the sweep frequency is substantially equal to the standard frequencies. This circuit produces accurate control pulses of uniform amplitude and duration to operate the measuring device at the standard frequencies.

Figure 2:
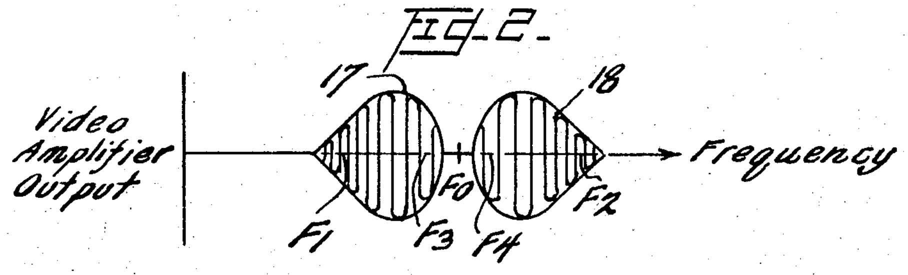
FIGS. 2, 3, 4 and 5 are waveforms of signals which are produced on respective parts of the embodiment shown in FIG. 1.

Two pulses 17 and 18 (FIG. 2) are produced by the mixer circuit 15 and the video amplifier 16 as the oscillator 10 sweeps through a standard frequency $F_0$. The outputs of the harmonic spectrum generator 14 and the sweep frequency oscillator 10 are applied to inputs of the mixer circuit 15. The output of the mixer circuit 15 contains a component frequency or beat frequency equal to the difference between the standard frequencies and the sweep frequency. This beat frequency is applied to a video amplifier 16 which performs the same function as a low bandpass filter by passing only a predetermined range of beat frequencies. Coupling capacitors, along with other factors within the video amplifier 16, determine the low cutoff frequency of the bandpass, and parasitic capacitances and other factors, in the video amplifier, determine the upper cutoff frequency of the video amplifier. The frequency difference between the harmonic frequencies of the harmonic spectrum generator 14 is much greater than the frequency bandpass of the amplifier 16. The frequency $F_0$ (FIG. 2) is one of the harmonic frequencies which are produced by the generator 14. Just before the oscillator 10 sweeps through the standard frequency $F_0$, the pulse 17 is produced in the output of the video amplifier 16 and just after the sweep frequency passes through the standard frequency $F_0$, the pulse 18 is produced on the output of the video amplifier 16.

Figures 3, 4, 5:
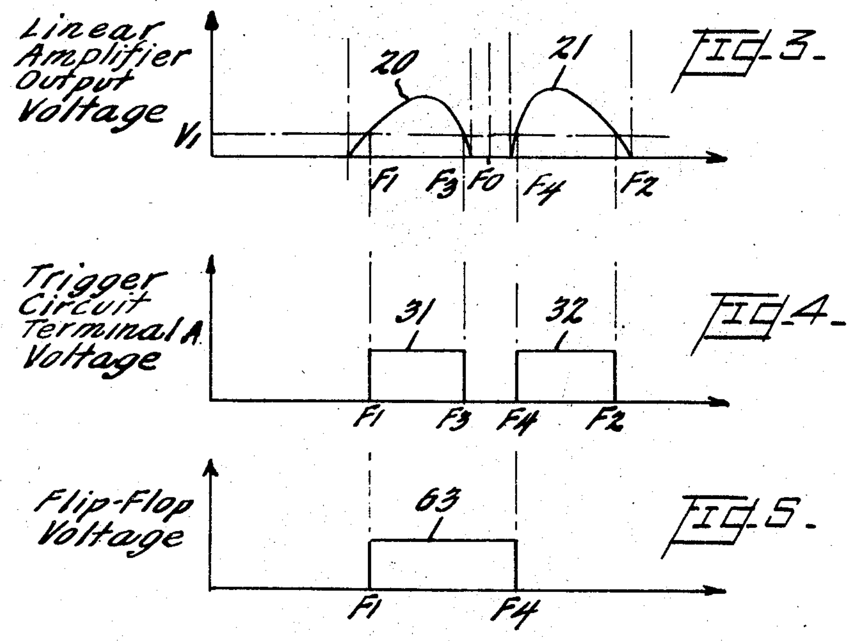

The pulses 17 and 18 are detected and amplified to produce two pulses 20 and 21 (FIG. 3) by applying the output of the video amplifier 16 to the amplitude detector 19, and the linear amplifier 25. The detector 19 rectifies the pulses 17 and 18 and removes the sinusoidal component. The trigger circuit 22 squares the pulses 20 and 21 to produce rectangular pulses 31 and 32 (FIG. 4). In the trigger circuit, two complimentary transistor amplifiers 23 and 24 connect the output of the linear amplifier 25 to a bistable multivibrator or flip-flop 26. The flip-flop 26 has a normally nonconductive transistor 27 and a normally conductive transistor 28. A diode 29, in series with the emitter of the transistor 27, inhibits the flow of current through the transistor 27 to initially cause the transistor 27 to be nonconductive and the transistor 28 to become conductive.

When the voltage from the amplifier 25 increases above the voltage $V_1$ (FIG. 4), a positive voltage is applied to the base of the transistor 27 to reverse the conductive states of the transistors 27 and 28. When the detecor output voltage drops below the voltage $V_1$, a negative voltage is applied to the base of the transistor 27 to revert the flip-flop to its original state. Output terminal A of the trigger circuit 22 is connected to the collector of the transistor 28 and the trigger circuit 22 produces the rectangular pulses 31 and 32 on the terminal A when the pulses 20 and 21 have a magnitude greater than $V_1$. As shown in FIG. 4, the pulse 31 is produced over the period that the oscillator 10 sweeps from the frequency $F_1$ to frequency $F_3$ and the pulse 32 is produced over the period that the oscillator 10 sweeps from frequency $F_4$ to frequency $F_2$.

The output of the trigger circuit 22 is applied to the input of a bistable multivibrator or flip-flop 33 which switches state only for positive-going edges of the pulses 31 and 32. The input of the flip-flop 33 is coupled by diodes 36 and 37 to first terminals of respective capacitors 38 and 39. Second terminals of the capacitors 38 and 39 are connected by diodes 43 and 44 to bases of transistors 41 and 42 such that positive voltages on the second terminals pass through the diodes 43 and 44 to the transistor bases. Negative voltages on the second terminals of capacitors 38 and 39 are blocked by diodes 43 and 44 and are shunted to ground by diodes 46 and 47. Resistors 48 and 49 couple the bases of the transistors 41 and 42 to a negative biasing voltage source 51, to bias the bases with a negative voltage equal to the respective forward voltage drops of the diodes 43 and 46 and of the diodes 44 and 47.

When voltages are initially applied to the collectors of the transistors 41 and 42, the forward resistance of a diode 52, connected in series with the emitter of transistor 41, inhibits the current through the transistor 41 and the positive feedback of the flip-flop 33 makes the transistor 41 normally nonconductive and the transistor 42 normally conductive. A diode 58 connects a collector of the transistor 42 to the first terminal of the capacitor 38 and a diode 59 connects the collector of transistor 41 to the first terminal of capacitor 39 to provide for steering of the pulses 31 and 32 to the base of a predetermined one of the transistors 41 and 42. Resistors 61 and 62 are connected between the first terminals of the respective capacitors 38 and 39 and ground potential.

When the first pulse 31 from the trigger circuit 22 is applied to the flip-flop 33, positive voltage applied to the first terminal of the capacitor 39 from the collector of transistor 41 prevents any change in voltage on the capacitor 39. The voltage on the capacitor 38 increases to apply a positive pulse to the base of transistor 41 to reverse the conductivity states of the transistors 41 and 42. Upon the trailing edge of the pulse 31, the voltage on the first terminal of the capacitor 39 decreases and the voltage on the first terminal of the capacitor 38 remains equal to the positive voltage on the collector of the transistor 42. Similarly, when the second pulse 32 from the trigger circuit 22 is applied to the flip-flop 33, the voltage on the first terminal of the capacitor 39 increases to apply a positive voltage to the base of the transistor 42 to switch the conductive states of the transistors 41 and 42. Thus, the transistor 41 is conductive and the transistor 42 is nonconductive while the oscillator 10 sweeps from freqeuncy $F_1$ to freqeuncy $F_4$ to produce a positive voltage pulse 63 (FIG. 5) on the collector of the transistor 42.

The pulse 63 has a duration which occurs over the period that the oscillator 10 sweeps from the frequency $F_1$ to the frequency $F_4$. As shown in FIG. 1, this pulse 63 is used to control the operation of the measuring device 12. The pulse 63, formed by the trigger circuit 22 and the flip-flop 33, is shorter in duration than a pulse produced from frequency $F_1$ to $F_2$, and thus, the duration of the pulse 63 varies less for different magnitude standard frequencies than the duration from frequency $F_1$ to frequency $F_2$. Also, the pulse 63 is a more accurate measure of when the oscillator frequency is equal to the standard frequency because of its shorter duration.

Figure 6:
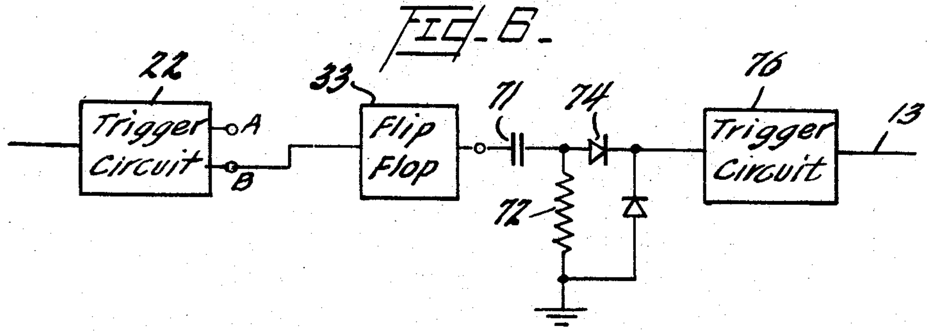
FIG. 6 is a diagram of an alternate embodiment of the invention.
Figure 7:
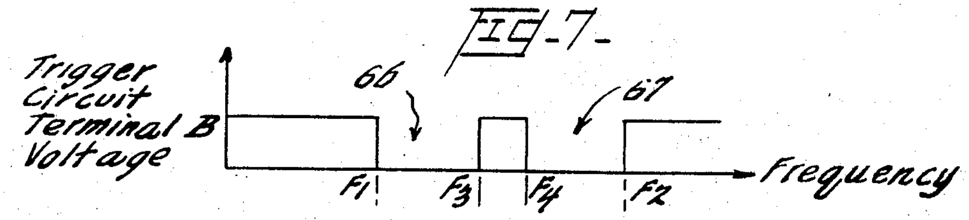
FIGS. 7, 8 and 9 are waveforms of signals which are produced on respective parts of the embodiment shown in FIG. 6.
Figure 8:
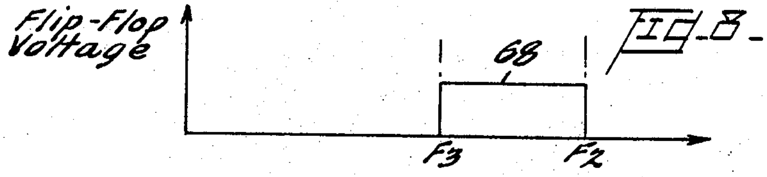

Referring now to FIG. 6, an alternate embodiment of the invention is shown. In the alternate embodiment, the input of the flip-flop 33 is connected to an output terminal B of the trigger circuit 22. As shown in FIG. 1, the output terminal B of the trigger circuit 22 is connected to the collector of the transistor 27. Inverse pulses 66 and 67 (FIG. 7) are produced on the terminal B as the oscillator 10 sweeps across frequency $F_0$. Since only positive-going edges of the pulses 66 and 67 trigger the flip-flop 33, the output pulse 68 (FIG. 8) of the flip-flop 33 has a duration over the period that the oscillator 10 sweeps from the frequency $F_3$ to the frequency $F_2$. If the flip-flop 33 is connected to the measuring device, as shown in FIG. 1, then the measuring device is operated from frequency $F_3$ to frequency $F_2$ by the pulse 68 in the same manner as the pulse 63 operates the measuring device from frequency $F_1$ to frequency $F_4$.

Figure 9:
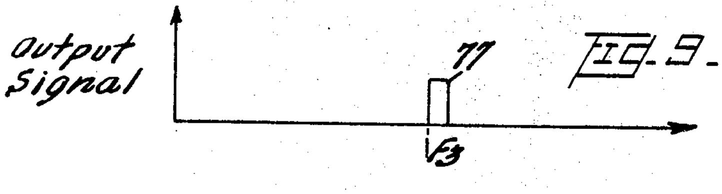

As shown in FIG. 6, the pulse 68 is differentiated by capacitor 71 and resistor 72 and the positive spike produced by the leading edge of the pulse 68 passes through a diode 74 to a trigger circuit 76. The trigger circuit 76 operates in a manner similar to the trigger circuit 22 to produce a square wave output pulse 77 shown in FIG. 9 with the leading edge of the pulse 77 starting at frequency $F_3$ to operate the measuring device 12. The duration of the pulse 77 is determined by the time constant of the capacitor 71, resistor 72, and the trigger level of the trigger circuit 76 and is entirely independent of different magnitudes of standard frequency voltages. The slope of the pulse 20, when the oscillator 10 is equal to frequency $F_3$, is steep and, thus, the operation of the measuring device occurs over a small range of frequencies which are substantially equal to the standard frequency $F_0$.

Figure 10:
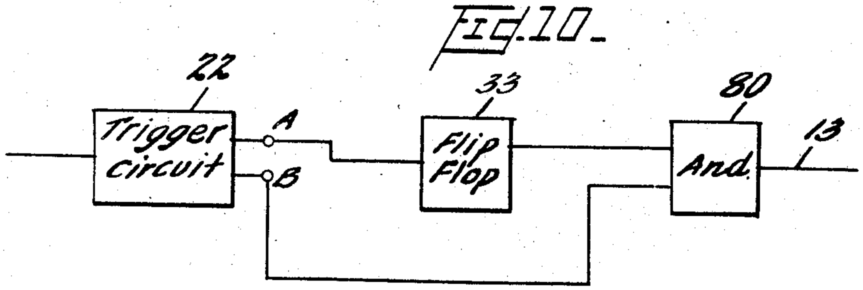
FIG. 10 is a diagram of still another embodiment of the invention.
Figure 11:
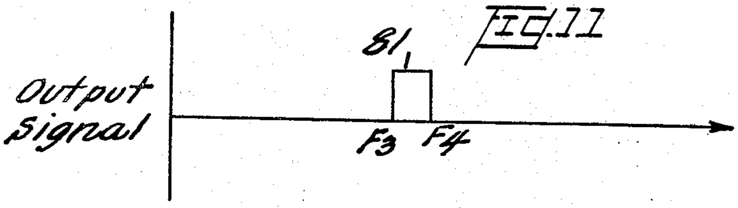
FIG. 11 is a waveform of the output signal of the embodiment shown in FIG. 10.

Referring to FIG. 10, still another embodiment of the invention is shown. The terminal A of the trigger circuit 22 is connected to the flip-flop 33. Terminal B of the trigger circuit 22 and the output of the flip-flop 33 are connected to two inputs of an AND gate 80. The pulse 63 (FIG. 5) and the inverse pulses 66 and 67 (FIG. 7) are thus applied to the inputs of the AND gate 80. There is a coincidence of a positive output on terminal B of trigger circuit 22 and the pulse 63 during the period that the oscillator 10 sweeps from the frequency $F_3$ to $F_4$. Thus, the AND gate 80 produces an output pulse 81 (FIG. 11) which has a duration equal to the period that the oscillator 10 sweeps from frequency $F_3$ to $F_4$. The slopes of the pulses 20 and 21 at frequencies $F_3$ and $F_4$ are steep, and thus, the duration of the pulse 81 does not vary substantially for large differences in magnitudes of standard frequencies.

It is to be understood that the above-described embodiments are simply illustrative of the principles of the invention and that many other embodiments can be devised without departing from the spirit and scope of the invention.

What is claimed is:

1. A circuit for producing a control signal when a sweep frequency is substantially equal to a standard frequency comprising:

mixer means for producing the product of the sweep frequency and the standard frequency, said mixer means including low bandpass filter means for producing a first pulse before the sweep frequency passes through the standard frequency and a second pulse after the sweep frequency passes through the standard frequency; and bistable means connected to the output of the mixer means for switching from a first state to a second state in response to a predetermined edge of the first pulse and from the second state to the first state in response to a predetermined edge of the second pulse, whereby the control signal is produced by the bistable means when it is in its second state.

2. A circuit for producing a control signal when a sweep frequency is substantially equal to a standard frequency as defined in claim 1 wherein:

the bistable means includes:

a trigger circuit connected to the mixer means and responsive to the first and second pulses having a magnitude greater than a predetermined magnitude for producing corresponding first and second rectangular pulses;

a bistable flip-flop circuit normally in a first state; and means connecting the trigger circuit to the flip-flop circuit for switching the flip-flop circuit from the first state to the second state in response to a predetermined edge of the first rectangular pulse and from the second state to the first state in response to a predetermined edge of the second rectangular pulse.

3. A circuit for producing a control signal when a sweep frequency is substantially equal to a standard frequency as defined in claim 2, wherein:

the switching means switches the flip-flop circuit from the first state to the second state in response to the trailing edge of the first rectangular pulse and from the second state to the first state in response to the trailing edge of the second rectangular pulse.

4. A circuit for producing a control signal when a sweep frequency is substantially equal to a standard frequency as defined in claim 2, wherein:

the switching means switches the flip-flop circuit from the first state to the second state in response to the leading edge of the first rectangular pulse and from the second state to the first state in response to the leading edge of the second rectangular pulse.

5. A circuit for producing a control signal when a sweep frequency is substantially equal to a standard frequency as defined in claim 1 wherein:

the bistable means includes:

a bistable flip-flop circuit normally in a first state;

means connecting the mixer means and the flip-flop circuit for switching the flip-flop circuit from the first state to the second state in response to a predetermined edge of the first pulse and from the second state to the first state in response to a predetermined edge of the second pulse, said flip-flop circuit producing a third pulse while in its second state; and differentiating means connected to the flip-flop circuit for producing the control signal from a predetermined edge of the third pulse.

6. A circuit for producing a control signal when a sweep frequency is substantially equal to a standard frequency comprising:

mixer means for producing the product of the sweep frequency and the standard frequency, said mixer means including low bandpass filter means for producing a first pulse before the sweep frequency passes through the standard frequency and a second pulse after the sweep frequency passes through the standard frequency;

a trigger circuit connected to the mixer means and responsive to the first and second pulses having a magnitude greater than a predetermined magnitude for producing corresponding first and second rectangular pulses;

a bistable flip-flop circuit normally in a first state;

means connecting the trigger circuit to the flip-flop circuit for switching the flip-flop circuit from the first state to the second state in response to a predetermined edge of the first rectangular pulse and from the second state to the first state in response to a predetermined edge of the second rectangular pulse, said flip-flop circuit producing a third rectangular pulse while in its second state;

an AND gate having a first input connected to the output of the flip-flop circuit; and means for applying the inverse of the first and second rectangular pulses to a second input of the AND gate whereby the control signal is produced by the AND gate.

References Cited

UNITED STATES PATENTS

| | | | |
|---|---|---|---|
| 2,991,416 | 7/1961 | Ramp et al. | 328—133 XR |
| 3,020,477 | 2/1962 | Lewinstein | 324—77 |
| 3,234,484 | 2/1966 | Cooper | 324—79 XR |

JOHN S. HEYMAN, Primary Examiner

J. ZAZWORSKY, Assistant Examiner

U.S. Cl. X.R.

307—233; 324—79; 328—140